(12) United States Patent
Bartolotta et al.

(10) Patent No.: US 12,106,073 B2
(45) Date of Patent: Oct. 1, 2024

(54) REDUCING CODE PATH PERMUTATIONS

(71) Applicant: Salesforce, Inc., San Francisco, CA (US)

(72) Inventors: Jeff Bartolotta, Concord, CA (US); Roopa Mohan, Dublin, CA (US); Josh Feingold, Chicago, IL (US)

(73) Assignee: Salesforce, Inc., San Francisco, CA (US)

( * ) Notice: Subject to any disclaimer, the term of this patent is extended or adjusted under 35 U.S.C. 154(b) by 147 days.

(21) Appl. No.: 17/881,832

(22) Filed: Aug. 5, 2022

(65) Prior Publication Data
US 2024/0045658 A1 Feb. 8, 2024

(51) Int. Cl.
*G06F 8/30* (2018.01)
*G06F 11/36* (2006.01)

(52) U.S. Cl.
CPC .......... *G06F 8/30* (2013.01); *G06F 11/3676* (2013.01); *G06F 11/3688* (2013.01)

(58) Field of Classification Search
CPC .... G06F 8/30; G06F 11/3676; G06F 11/3688; G06F 8/00; G06F 11/36
USPC ....................................................... 717/151
See application file for complete search history.

(56) References Cited

U.S. PATENT DOCUMENTS

| | | | |
|---|---|---|---|
| 2009/0217248 A1* | 8/2009 | Bently | G06F 8/30 717/132 |
| 2011/0004834 A1* | 1/2011 | Martino | G06Q 10/00 715/763 |
| 2012/0311545 A1* | 12/2012 | Li | G06F 11/3676 717/124 |
| 2017/0083327 A1* | 3/2017 | Burger | G06F 9/30047 |
| 2018/0217830 A1 | 8/2018 | Bartolotta et al. | |
| 2019/0004934 A1* | 1/2019 | Huchegowda | G06F 11/3684 |

OTHER PUBLICATIONS

Farcy et al, "Dataflow Analysis of Branch Mispredictions and Its Application to Early Resolution of Branch Outcomes", 1998, [Online ], pp. 1-10, [Retrieved from internet on Jun. 10, 2024], <https://ieeexplore.ieee.org/stamp/stamp.jsp?arnumber=742769> (Year: 1998).*

* cited by examiner

*Primary Examiner* — S. Sough
*Assistant Examiner* — Zengpu Wei
(74) *Attorney, Agent, or Firm* — Kwan & Olynick LLP

(57) ABSTRACT

Systems, methods, and computer-readable media are provided for reducing a number of potential code paths such that it is feasible to examine all possible code paths within source code. Source code may be received. The source code may be traversed such that the path is recorded. Predicates may cause the path to split such that both paths can be traversed with the result of the predicate stored such that the path does not need to split again when encountering a new predicate for which the stored predicate is determinative. The determined paths can then be used by applications.

19 Claims, 7 Drawing Sheets

```
400
402  if(x==0)
         print(1a);
     else
         print(1b);
404  if(x==0)
         print(2a);
     else
         print(2b);
```

FIG. 4A

```
406
408  if(x==0)
         print(1a);
     else
         print(1b);
410  if(x!=0)
         print(2a);
     else
         print(2b);
```

FIG. 4B

```
412
414  if(x==0)
         print(1a);
     else
         print(1b);
416  if(y==0)
         print(2a);
     else
         print(2b);
418  if(x==0 AND y==0)
         print(3a);
     else
         print(3b);
```

FIG. 4C

```
420
422  if(x>0)
         print(1a);
424  elseif(x<=0)
         print(1b);
426  else
         print(1c);
```

FIG. 4D

```
500
502  if(x==0)
         print(1a);
     else
         print(1b);
504  x = loadVariable();
506  if(x==0)
         print(2a);
     else
         print(2b);
```

FIG. 5A

```
508
510  if(x>0)
         print(1a);
     else
         print(1b);
512  x = x + 1;
514  if(x>0)
         print(2a);
     else
         print(2b);
```

FIG. 5B

```
516
518  if(x==0)
         print(1a);
     else
         print (1b);
520      x=0;
522  if(x==0)
         print(2a);
     else
524      print(2b);
```

FIG. 5C

REDUCING CODE PATH PERMUTATIONS

FIELD OF TECHNOLOGY

The present disclosure relates generally to code optimization, and more specifically to reducing the number of potential code paths by tracking predicates to exclude impossible paths based on identified branch predicate constraints.

BACKGROUND

When executing computer programs, executed code within the program may travel down different branching paths depending on the outcomes of tests, or predicates, that determine which branch of the code should be executed. Data flow analysis can be performed on source code to evaluate which paths within the source code may be traversed by a program executing the source code. For example, such data flow analysis can be used by compilers to optimize such programs, for testing, or to enforce security constraints.

However, in general, exhaustively considering all possible data paths scales exponentially with the number of branches. Furthermore, when the (compiled) source code is executed in practice, only a comparatively small number of this exponentially large number of code paths will actually be executed, because of reused predicates or dependencies between predicates. What is needed, therefore, are techniques for narrowing the set of all code paths to those which are possible to be executed by a running program based on the branch predicates.

BRIEF DESCRIPTION OF THE DRAWING FIGURES

Embodiments of embodiments are described in detail below with reference to the attached drawing figures, wherein:

FIGS. 4A-4D depict certain predicates relating to certain embodiments;

FIGS. 5A-5C depict certain source code statements relating to certain embodiments;

Figure 1:
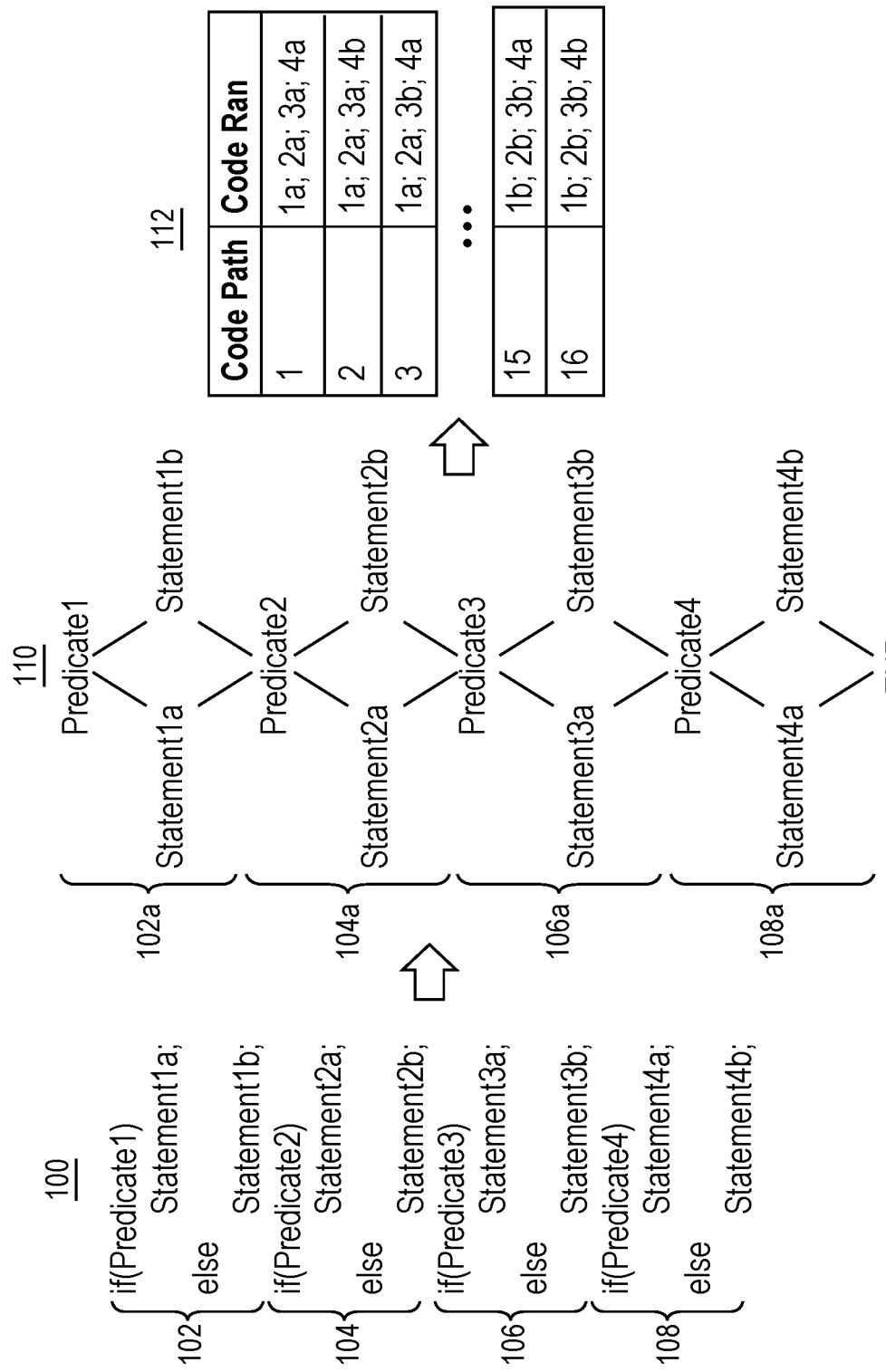
FIG. 1 depicts how source code paths are evaluated.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments disclosed herein are related to improved methods, media, and systems for tracking predicates and other constraints when examining source code to efficiently determine all possible paths through which the source code may be traversed. This can be achieved by storing assumed constraints when predicates are reached such that the branching path at a first predicate and a second predicate which is deterministic to the first predicate will be the same. This eliminates the need to explore paths which would be impossible at runtime. By storing such assumptions, the exponential branching effect of traversing the same predicate multiple times can be eliminated. This allows for all of the possible paths within source code to be traversed such that applications can then use the list of all possible paths to provide a variety of benefits including enhanced security, improved code debugging, improved code testing, and improved code performance.

In some embodiments, the full path list may be used to evaluate software security. The path list may be used to ensure that proper authentication steps are in place before any actions are taken on resources by determining that there are no instances when those actions may be taken where the proper authentication is not completed. In further embodiments, the path list may be used to identify all potential null pointer exceptions and identify the specific path which may lead to such issues. In still further embodiments, the path list may be used by a compiler to generate optimized object code by allowing the compiler to more intelligently fetch code to optimize the memory and execution speed. In even further embodiments, the path list may be used to improve code quality via dead code detection and improved code testing by identifying portions of code which either are impossible to reach, or which have not been sufficiently tested for all possible paths. In yet further embodiments, the path list may be used to improve performance, by for example, linking together operations which will always follow one another regardless of the code path.

Exemplary Embodiments

FIG. 1 depicts exemplary source code which will be useful in illustrating the operation of various embodiments, as discussed in further detail below. Source code 100 depicts code block 102, code block 104, code block 106, and code block 108. While source code 100 is depicted as pseudocode, any type of code or programming language including Java, JavaScript, C, C++, C#, Python, R, Ruby, Go, Swift, or any other language is envisioned in certain embodiments. Source code 100 may exist as one file or may exist across multiple files, file directories, or other locations. In particular, embodiments are contemplated where the source code 100 spans multiple function classes or other code units, and can visit the same function, class, or code unit multiple times.

Code block 102 may include one or more predicates and one or more code statements associated with each possible value of the predicate. For example, as shown, each predicate has only two possible branch outcomes; however, predicates such as switch statements with more than two branch outcomes are also contemplated. A predicate may evaluate one or more variables and return a value based on the evaluation, with a branch outcome selected based on the value. For example, a variable X may be checked in a predicate to determine if the variable is equal to zero. If X is equal to zero, the predicate would return true, and a first code path would be executed; otherwise, the predicate would return false, and a second code path would be executed. For example, if a first predicate returns true, then statement 1a may run. Otherwise, if the first predicate returns false, then statement 1b may run. This branching effect is depicted as code branches 110 which contains code branches 102a, code branches 104a, code branches 106a, and code branches 108a each corresponding to the respective code block.

Code table 112 depicts the possible code path permutations and the corresponding code which would run. As depicted, source code 100 depicts four predicates, each of which could evaluate to either true or false. As such, there are sixteen possible code path permutations which could be taken for source code 100. The number of code path permutations is exponential based on the number of predicates. Accordingly, it quickly becomes infeasible to traverse and examine all of the potential paths within a large amount of source code.

Figure 2:
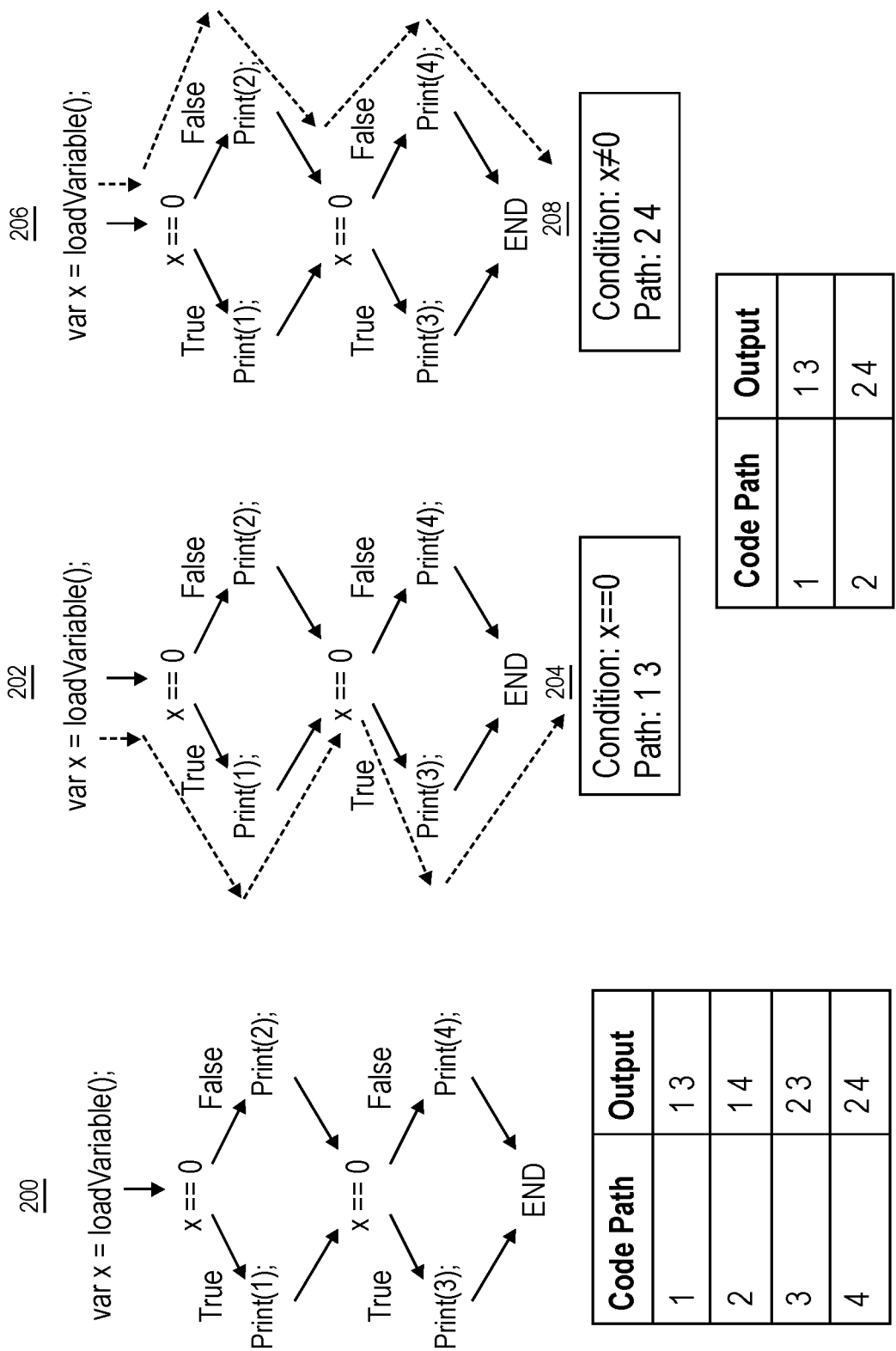
FIGS. 2A and 2B depict certain embodiments.

FIG. 2A depicts source code example 200, providing a concrete example of the various code paths and their outcomes. For brevity, each permutation of code paths is referred to herein simply as a "code path;" however, it should be noted that execution of code segments may branch and rejoin such that different code segments are permuted for each such code path. Source code example 200 begins by initiating a variable x. Because the value of x may come from an external source, such as a database, through an API call, or some other method with a value unknown until run-time, the value of x cannot be determined via static analysis (e.g., simply by examining source code example 200). Accordingly, it cannot be determined in advance whether or not x is equal to zero and therefore which branch outcome will be taken. As depicted, source code example 200 comprises two predicates and, as such, there are four potential code paths through source code example 200. However, both predicates check whether x is equal to zero, meaning that two of the potential code paths are impossible for this example. In other words, if x is equal to zero at the first predicate, x will still be equal to zero at the second predicate as the value of x is unchanged. Accordingly, only two of the code paths are actually possible regardless of the value of x.

FIG. 2B depicts source code example 202 showing an exemplary embodiment. The execution of source code 100 may branch either of two ways after a predicate, with a first branch leading towards a path where the predicate is true and a second branch leading towards a path where the predicate is false. In some embodiments, code path visitor 204 may be used to traverse the source code. Code path visitor 204 may be any type of programmed structure or path visiting object which is able to traverse the source code. For example, code path visitor may be implemented as a class with members and methods if implemented in an object-oriented programming language. The values of any predicates associated with previously visited code paths may be stored in the code path visitor as assumed values. As used herein, an "assumed value" is any information used in evaluating a predicate that is not statically known but can be assumed to be true given that code execution is proceeding down a given code path. For example, in the case of code path visitor 204, x has an assumed value of 0 (given that code has proceeded through code path 1. By contrast, for code path visitor 208, x has an assumed non-zero value. Prior to storing these values, the code path visitor may create a duplicate instance of itself when reaching a branch such that one instance visits each possible path (and thus, such that one instance stores each possible predicate value). For example, code path visitor 208 may be created as a duplicate of code path visitor 204 within source code example 206 upon reaching the first branch of source code example 206. In this example, code path visitor 204 may store the assumption that x is equal to zero such that the predicate evaluates to true, while code path visitor 208 may store the assumption that x is not equal to zero such that the predicate evaluates to false. Note that such an assumption may provide only constraints on a predicate (x being non-zero) rather than a specific value (x being equal to some specific non-zero value).

After code path visitor 204 and code path visitor 208 are created and the corresponding assumed values stored, code path visitor 204 and code path visitor 208 may continue to independently traverse the source code. When code path visitor 204 encounters the second predicate, it can evaluate whether the branch is deterministic based on the stored assumed predicate values. Determining that the assumption of x being equal to zero has been stored, code path visitor 204 can determine that the second predicate will always evaluate to true. Therefore, code path visitor 204 does not need to consider the additional path where the first predicate evaluates to true but the second predicate evaluates to false. By contrast, code path visitor 208 will have stored the assumption of x being non-zero. When code path visitor 208 reaches the second predicate, it will determine that the second predicate must always evaluate to false based on the assumed values for x. In some embodiments, tracking the conditional predicates this way can significantly reduce the number of paths that need to be traversed by eliminating paths which are impossible. In some embodiments, assumed values for any number of variables may be stored in a code path visitor so that the values of compound predicates can be determined based on a plurality of previously visited code paths.

Operation of Embodiments

Figure 3:
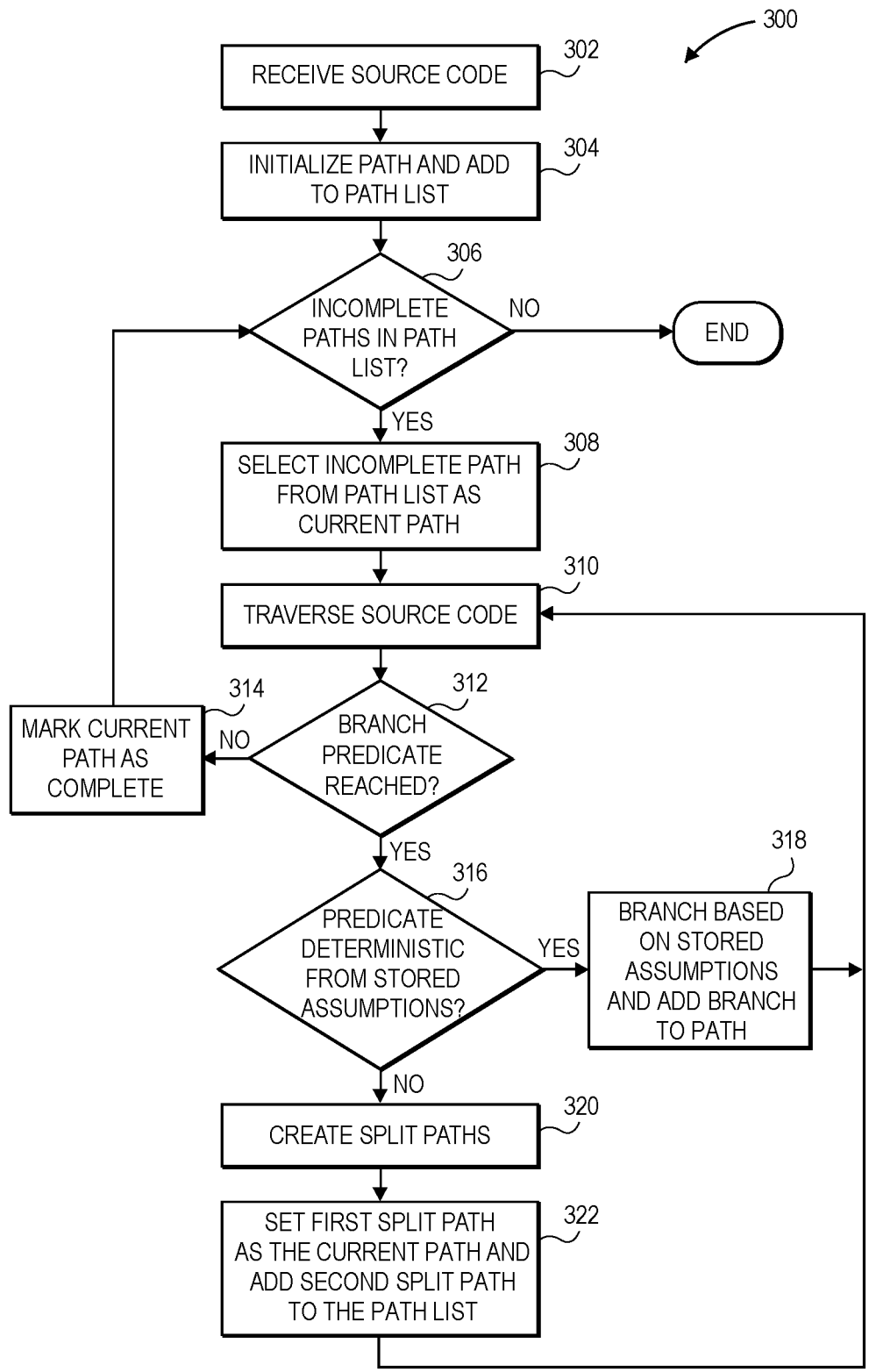
FIG. 3 depicts an exemplary flowchart relating to certain embodiments.

FIG. 3 depicts an exemplary flowchart illustrating a method 300 for an embodiment. At step 302, source code is received. In some embodiments, the source code may span a plurality of classes, modules and/or functions. In some embodiments, the source code may be in any form including a single file or multiple files. In further embodiments, the source code may be a reference to source code stored in a particular location, directory, source code repository, or database, and receiving the source code may include an additional step of downloading or otherwise accessing the source code from its location. The source code may be in any programming language, including but not limited to those listed above. In some embodiments, the source code may be preprocessed by parsing to produce intermediate representations such as one or more abstract syntax trees.

At step 304, a path (for example, a path object representing a particular execution path through some or all of the received source code) is initialized and added to an initialized path list. In some embodiments, the path list may eventually comprise all such execution paths possible for the received source code. The final result may be a list of all possible code path permutations (or in some embodiments, substantially all code path permutations, most code path permutations, or a plurality of code path permutations) through the code. In other embodiments, the path list may contain only the paths which have not yet been fully traversed and may relocate completed paths to a completed path list. The path list may store the paths in the order that they are added. In some embodiments, the path list may be sorted to increase efficiency of path traversal. For example, the path list may be sorted by the number of conditions such that paths with more conditions are executed first. As another example, the path list may be sorted by the path length such that shorter paths are executed first.

At step 306, it is determined whether or not there are any incomplete paths remaining in the path list. In some embodiments, the paths in the path list may be searched to determine if any of the paths are not marked as complete. In other embodiments, completed paths may have been moved to a second, completed path list such that all remaining paths will be incomplete paths. If there are no incomplete paths in the path list, method 300 ends. Otherwise, if there are incomplete paths then the method will continue to step 308 such that additional paths can be completely traversed.

At step 308, an incomplete path is selected from the path list as the current path. In some embodiments, the selected path may be random. In other embodiments, the selection may be optimized to select the most efficient path or otherwise reduce execution time and/or complexity of the analysis. For example, the path list may be sorted on some metric such as path length. In some embodiments, the paths may retain the order in which they were added such that the next path selected is similar to the path most recently traversed. In some embodiments, the list of incomplete paths may be stored as a tree corresponding to the tree of potential execution paths. Other traversal orders (such as, for example, breadth-first traversal of a path tree, depth-first traversal of a path tree) are also contemplated.

At step 310, the source code is traversed. In some embodiments, the source code may be traversed using a path visiting object to navigate through the source code based on the current path. In some such embodiments, code statements within the source code may be analyzed during traversal and some code statements may either modify stored assumed conditions or be added as new assumed conditions. For example, if a code statement assigns a variable, x, to null, then for that path an assumption that x==null may be added. The path visiting object, traversing a different path (or a different variation of that path) might add a different assumption for x, or might add no assumption for x at all. This may allow the path to more efficiently branch because the value of x will be known by assumption for that path. As another example, if a code statement assigns variable x to some unknown value, such as by pulling the value from a database such that the value would only be known at runtime, then no assumption may be added, and any stored assumption referencing the variable x may be removed from the path constraints. The modification of stored assumptions based on encountered code statements is discussed further below at FIGS. 5A-5C.

At step 312, it is determined whether or not a branch with a predicate is reached. A branch may be any decision point based on a predicate which evaluates to one or more values (for example, the predicate may evaluate to either true or false). In some embodiments, a predicate may be a switch statement or other similar conditional statement which causes the source code to branch in more than two branches. If a predicate is reached, the method proceeds to step 316. If a predicate is not reached, then that means the current path has reached an end point and the method proceeds to step 314.

At step 314, the current path is marked as complete. Having not reached any additional predicates, the current path is complete and no additional processing is needed. In some embodiments, a path may be marked as complete by updating a variable associated with the path. In further embodiments, the current path may be moved from the path list to a secondary, completed path list for storing the completed paths. Once a path is complete, it can then be used along with the other possible paths in a variety of applications.

At step 316, it is determined whether or not the predicate which was just reached is deterministic based on one or more stored assumptions. A predicate is deterministic based on one or more stored assumptions when there is only one possible branch for the predicate based on those stored assumptions. For example, if there is a stored assumption that x is null (based, for example, on the current path traversing a previous branch where x was assumed to be null) then a predicate asking whether x is null will be deterministic as it will always evaluate to true. Similarly, if there is a stored assumption that x is null then a predicate asking whether x is not null will also be deterministic, as the result will always be false. Additional examples of deterministic predicates are discussed below at FIGS. 4A-4D. Stored assumptions may be predicates and how they are evaluated, specific variable values, or any other conditions or constraints which might determine how a predicate would be evaluated. If the predicate is deterministic based on a stored constraint, then the method proceeds to step 318. Otherwise, the method may proceed to step 320.

At step 318, the path may branch based on the stored constraint and add the branch to the path. For example, if there is a stored assumption that x==0 and the encountered predicate is x==0, then the predicate will be evaluated as true without any need to consider the impossible path. In other words, the predicate will have already been predetermined based on a prior constraint for the path. In some embodiments where more than two branch outcomes are possible for a particular branch, a plurality of branches may be determined to be possible while one or more outcomes may be determined to be impossible based on the stored constraint(s). In such cases, split paths are created for the possible branches (as described below) and the impossible branches are disregarded. Pruning impossible branches in this way allows the method to ignore paths which are not possible and enables the examination of all possible paths to be feasible even where the examination of all potential paths is not. Then, the method proceeds to step 310 so that the traversal of the source code can continue.

At step 320, having determined that multiple outcomes for a branch are possible, split paths are created. In some embodiments, the split paths may be created by duplicating the current path (together with all the prior assumed values and constraints) such that there is a first copy and a second copy of the current path. Once the current path is duplicated, a first branch of the predicate may be added to the first duplicate with a first assumption and the second branch of the predicate may be added to the second duplicate with a second, contrary assumption. For example, upon reaching a new predicate which asks if the variable z is true, the first duplicate may add a new assumption that z is true, and the second duplicate may store a new assumption that z is false. The original path may then be removed from the path list. In other embodiments, the split paths may be created by adding one branch of the predicate to the current path and creating a new path which mirrors the assumptions of the current path except that it adds the other branch of the predicate.

At step 322, the first split path may be set as the current path and the second split path may be added to the path list. This allows both possible branches of the predicate to be fully traversed. In some embodiments, the current path may simply remain the current path and have one branch added to it, while the other branch will be added to a duplicate of the current branch and then added to the path list. Regardless of implementation, this allows both branches of the predicate to be traversed and a corresponding condition will be added to the path such that any later deterministic predicates will be predetermined. Then, the method proceeds to step 310 so that the traversal of the source code can continue.

Exemplary Source Code

FIG. 4A depicts source code 400. Source code 400 contains predicate 402 and predicate 404, both of which are checking whether a variable, x, is equal to zero. Source code 400 displays the most basic instance where one predicate is deterministic to a second predicate. Here, both predicate 402 and predicate 404 are identical. Therefore, for every possible value of x they will have the same result. As a result of this, only the potential code paths that print "1a" followed by "2a" or "1b" followed by "2b" are possible code paths. The potential code paths that print "1a" followed by "2b" or "1b" followed by "2a" are impossible code paths and can be disregarded for the sake of source code analysis.

FIG. 4B depicts source code 406. Source code 406 contains predicate 408 and predicate 410. Predicate 408 checks whether a variable, x, is equal to zero. In contrast, predicate 410 checks whether x is not equal to zero. Here, predicate 408 and predicate 410 are deterministic because for every value of x, the result of predicate 408 can be determined by the result of predicate 410, and vice versa. In this instance, the result of predicate 408 will be the opposite of the result of predicate 410 for all values of x. Here, only the potential code paths that print "1a" followed by "2b" or "1b" followed by "2a" are possible code paths. The potential code paths that print "1a" followed by "2a" or "1b" followed by "2b" are impossible code paths and can be disregarded for the sake of source code analysis.

FIG. 4C depicts source code 412. Source code 412 contains predicate 414, predicate 416, and predicate 418. Predicate 414 checks whether a variable, x, is equal to zero. Similarly, predicate 416 checks whether a variable, y, is equal to zero. Predicate 418 checks whether both variable x and variable y are equal to zero. Predicate 418 will evaluate to true only in the instance that both predicate 414 and predicate 416 evaluate to true. Accordingly, the combination of predicate 414 and predicate 416 is deterministic to predicate 418. Here, of the eight potential code paths, only four code paths are possible (printing "1a," "2a," and then "3a" and printing one of the other three combinations of "1a"/"1b" then "2a"/"2b," followed by "3b") and the other four are impossible.

FIG. 4D depicts source code 420. Source code 420 contains predicate 422, predicate 424, and predicate 426. Predicate 422 checks whether a variable, x, is greater than zero. In contrast, predicate 424 checks whether x is less than or equal to zero. Predicate 422 and predicate 424 are deterministic for the same reason discussed above in FIG. 4B. Additionally, the combination of predicate 422 and predicate 424 is deterministic for predicate 426. Because predicate 422 and predicate 424 cover all possible values for x, predicate 426 will always be false regardless of how predicate 422 and predicate 424 are evaluated. Because predicate 426 will always evaluate to false, any corresponding code statements will never run and would be considered unreachable or dead code. As such, only two of the three potential code paths (printing "1a" or printing "1b" are possible), and the remaining potential code path (printing "1c") is impossible.

FIG. 5A depicts source code 500. Source code 500 contains predicate 502, code statement 504, and predicate 506. Predicate 502 and predicate 506 are identical, as in FIG. 4A, and would therefore (in the absence of code statement 504) be deterministic. However, code statement 504 modifies the variable associated with predicate 502 and predicate 506. In some embodiments, when a variable associated with a stored predicate is modified in an indeterminate way, the predicate may be removed or otherwise deleted from a path as the predicate may no longer have the same value. For example, a variable, x, may have been equal to zero and caused predicate 502 to evaluate to true, been changed by code statement 504 such that x becomes nonzero, thus causing predicate 506 to evaluate to false. In this case, all four potential code paths are possible because the variable on which the predicate depends has been non-deterministically modified in between identical tests.

FIG. 5B depicts source code 508. Source code 508 contains predicate 510, code statement 512, and predicate 514. As in FIG. 5A, predicate 510 and predicate 514 are identical and would therefore be deterministic in the absence of code statement 512. However, code statement 512 modifies the variable associated with predicate 510 and predicate 514. Here, the modification changes the deterministic nature of predicate 510 and predicate 514 only under certain circumstances. For example, if predicate 510 is assumed to be true, then the assumption that x is greater than zero would be stored in the path object. Upon reaching code statement 512, this assumption would be modified (reflecting code statement 512) to instead assume that x is greater than 1. In this case, predicate 514 would be deterministic, because x is greater than zero if it is greater than one. On the other hand, the alternative code path (storing the assumption that x is less than or equal to zero) would be updated based on code statement 512 to reflect that x is less than or equal to one. This assumption does not render predicate 514 deterministic, so splitting the code path would be required. Thus, for source code 508, three of the potential code paths are possible (printing "1a" then "2a," printing "1b" then "2a" and printing "1b" then "2b"). The fourth potential code path (printing "1a" then "2b") is impossible and can be disregarded during analysis.

FIG. 5C depicts source code 516. Source code 516 contains predicate 518, code statement 520, predicate 522, and code statement 524. Like the prior examples in FIGS. 5A and 5B, predicate 518 and predicate 522 are identical would therefore be deterministic without code statement 520. However, code statement 520, which executes only if predicate 518 is false, modifies the variable associated with predicate 518 and predicate 522. Specifically, code statement 520 sets the variable x equal to zero, with the result being that regardless of the initial value of x, x will always equal zero when it reaches predicate 522. In some embodiments, code statements which modify variables can be either added as new constraints or overwrite existing constraints. Because predicate 522 will always evaluate to true, code statement 524 will never be executed and may therefore be identified as an invalid or impossible path and identified as dead code. Thus, in this example, two of the four potential code paths (those printing "1a" then "2a" and "1b" then "2a") are possible, then the remaining two code paths (those which involve printing "2b") are impossible and can be disregarded.

Exemplary System Embodiment

Figure 6:
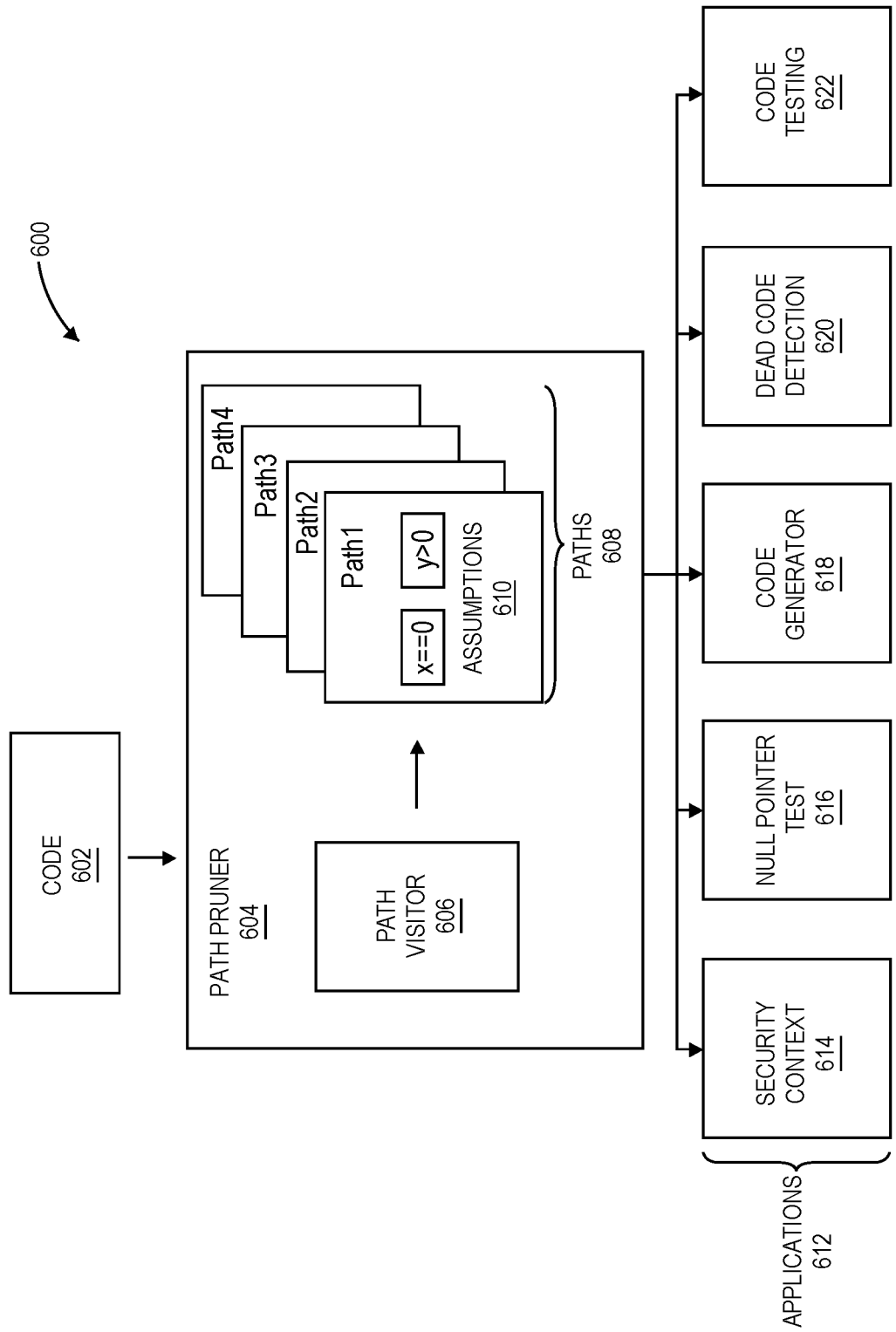
FIG. 6 depicts an exemplary system relating to certain embodiments.

FIG. 6 depicts a system 600 for an embodiment. System 600 includes source code 602 which is received into path pruner 604. In some embodiments, source code 602 may be source code in any language and/or format. Source code 602 may be stored either internally or externally. In some embodiments, source code 602 may be pre-processed before being received into path pruner 604. For example, multiple separate source code files may be combined into one larger file for improved processing. Alternatively, or in addition, source code 602 may be pre-processed (for example by parsing) into an intermediate representation such as one or more abstract syntax trees.

Path pruner 604 may comprise path visitor 606 and one or more paths 608. In some embodiments, path visitor 606 may be initiated upon receiving source code 602. Path visitor 606 may be configured to traverse source code 602 and to store information about predicates, branching, and code statements traversed as paths 608. Paths 608 may be created for every possible path within source code 602 by duplicating the current path when a new predicate is reached and assigning a true value to the new predicate for a first path and a false value to the new predicate for a second path. These predicate values may be stored as assumptions 610 within paths 608. Assumptions 610 may be used when path visitor 606 reached a predicate while traversing paths 608 to determine whether or not the newly reached predicate is deterministic based on some or all of the assumptions 610 of the current path.

Once path pruner 604 determines all of the possible paths 608, the path information may be passed to one or more applications 612 which may use the path, Exemplary applications 612 include (but are not limited to) security context 614, null pointer test 616, code generator 618, dead code detection 620, and code testing 622. These applications 612 may use the provided paths 608 for a variety of purposes. In some embodiments, applications 612 may be incorporated into existing programs such as integrated development environments or other coding platforms.

Security context 614 may use paths 608 to ensure that all required security constraints have been satisfied before any privileged actions are taken. This is made possible by the fact that each of code paths 608 represents a linear execution of source code 602 rather than the original branching, looping, conditional form of source code 602. For example, the set of paths 608 may be examined to ensure that a user is only ever able to modify a file record if the user has been properly authenticated. Given the set of all possible paths 608 through source code 602 and an indication of one or more authentication method and one or more privileged operations, security context 614 can determine that the authentication step has preceded the modification step in every path in which the modification step is performed, thereby verifying that unauthenticated modification is not possible for the program represented by source code 602. In some embodiments, security context 614 may use paths 608 to ensure that some specific set of paths 608 and assumptions 610 never occurs. For example, security context 614 can ensure that (after the user has successfully logged into the system) that the user has not since logged out of the system prior to performing the modification. In this example, such a test would verify that no code path includes steps of logging in, logging out, and then modifying in that order.

As another application, null pointer tests 616 may use paths 608 to identify possible null pointer exceptions or uninitialized object references which may result in errors or program crashes. To implement such a test, the set of all code paths can be examined (for example together with an indication of one or more variables storing pointers or references) to verify that every code path which dereferences a pointer includes a code statement initializing that code statement to a non-zero value. For example, an initial assumption can be stored in the initial code path that each pointer or reference is uninitialized. Code paths which reach a pointer or object dereference with that assumption still in place can generate a compiler error or other warning to the programmer. In further embodiments, null pointer tests 616 may provide the specific code paths 608 which may cause a null pointer exception as part of the warning or error message. For example, all of the potential paths in the source code may be searched to determine when a variable is referenced if it has been previously initiated and return all possible paths which could conceivably cause a null pointer exception. This can provide helpful feedback to programmers by identifying specific causes of null pointer exceptions which can be particularly challenging to identify when they only occur in a small subset of potential paths.

Code generator 618 may use paths 608 to generate an optimized version of code 602. In some embodiments, code generator 618 may function as an improved compiler by utilizing information about the set of possible code paths to perform code optimizations such as loop unrolling, branch prediction, and/or branch hinting. By using the information identifying possible and impossible code paths, code generator 618 may be able to more efficiently pre-fetch code to improve run time efficiency and memory. Code generator 618 may generate code which is semantically equivalent to a conventionally compiled version of code 602 but which either uses fewer resources (such as memory or processing capability) or is capable of faster execution. Alternatively, or in addition, code generator 618 may optimize code based on a determination that operation B following operation A would affect performance in any code path no matter how far away the operations are from each other. Similarly, code generator 618 may optimize code based on a determination that that a particular operation's occurrence inside a loop will be detrimental to code performance no matter how many method handoffs happened within the loop as long as it eventually reaches the operation.

Dead code detection 620 may use paths 608 to identify portions of code 602 which are unreachable, otherwise known as dead code. Such dead code can be detected by searching within paths 608 and identifying any code portions which are not present in any of the paths. Dead code may occur when, based on the stored predicates, there is no possible path of any of the paths 608 which would cause the code to execute. Such dead code may occur for those reasons discussed above at FIG. 4D and FIG. 5C. In some embodiments, dead code detection 620 may automatically highlight the portions of dead code in an integrated development environment for the benefit of a programmer who is editing code 602. In further embodiments, dead code may be automatically removed from within the source code.

In some embodiments, dead code detection 620 may be used in combination with code generator 618. Dead code may be identified by dead code detection 620 and then removed from the object code by code generator 618 such that the code is optimized. For example, unreachable code may be simply ignored and not compiled to save memory. This is possible because dead code detection 620 is able to identify code, including across multiple files, which is never reachable under any execution circumstances.

Code testing 622 may use paths 608 to improve the testing of code 602. In some embodiments, code testing 622 may be leveraged along with a testing suite to improve the amount of code coverage by considering all of the possible code paths, or to confirm that an existing test suite covers all (or substantially all) of the possible code paths. In some embodiments, code testing 622 can suggest test cases corresponding to specific paths which can subsequently be used for testing. For example, code testing 622 can identify predicates and corresponding values which might cover specific paths 608. In some embodiments, code testing 622 can also suggest more sophisticated tests which can then be transmitted for further processing. For example, in addition to identifying that a portion of code is covered by a test, code testing 622 can suggest alternative values for variables such that the portion of code can be tested under other circumstances which may cause the code to perform differently.

Operational Environment for Embodiments

Figure 7:
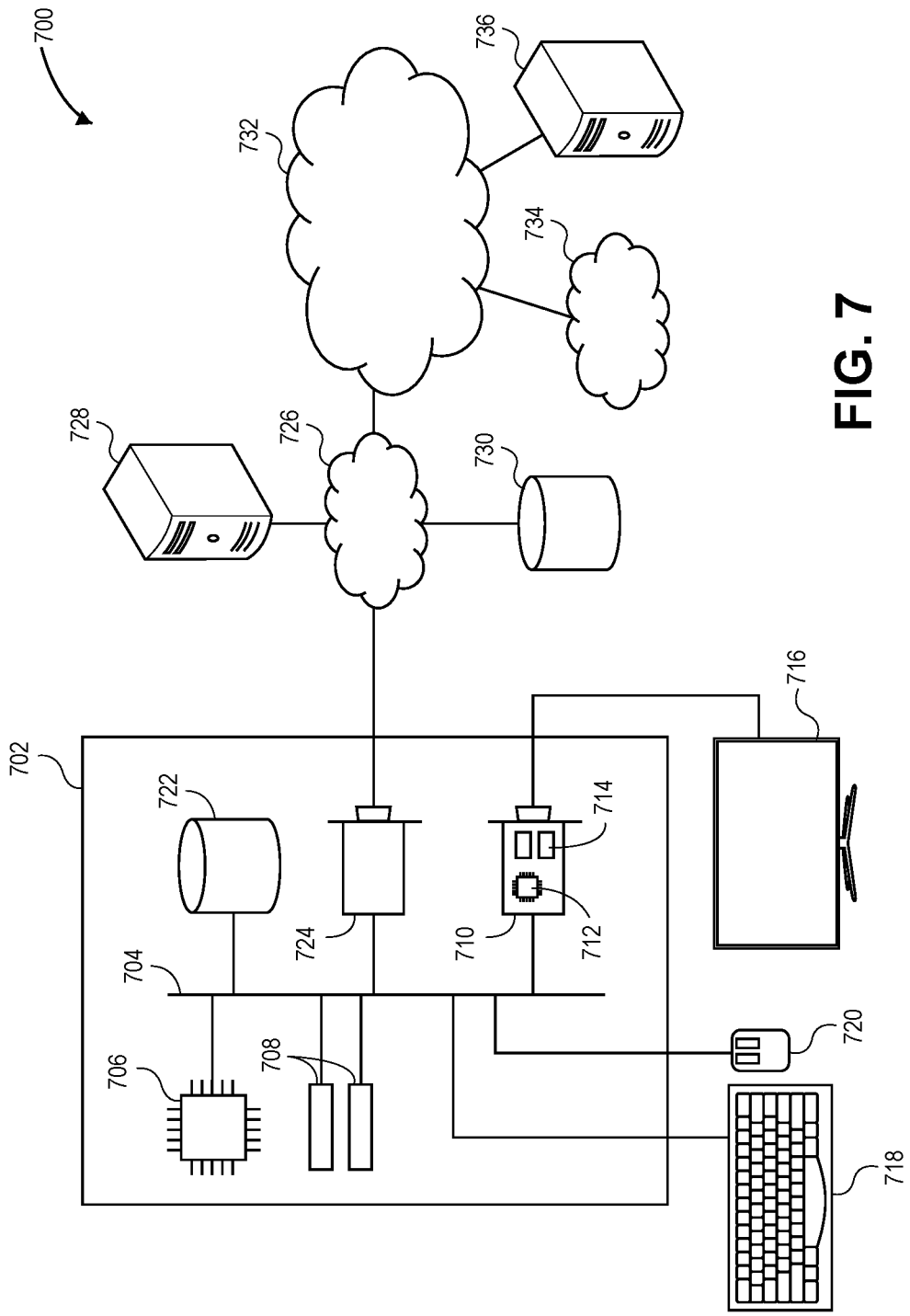
FIG. 7 depicts an exemplary hardware platform relating to certain embodiments.

FIG. 7 illustrates an exemplary hardware platform 700 for certain embodiments. Computer 702 can be a desktop computer, a laptop computer, a server computer, a mobile device such as a smartphone or tablet, a wearable device such as a watch or headset, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple buses, or components may communicate with each other directly. CPU 706 is at least one central processing unit (also called a processor) connected to system bus 704. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments, no display is present, while in others it is integrated into computer 702. Similarly, peripherals such as keyboard 718 and mouse 720 are connected to system bus 704. Like display 716, these peripherals may be integrated into computer 702 or absent. In some embodiments, additional peripherals such as a microphone or video camera may also be present and connected to system bus 704. In some embodiments, such peripherals may be detachable connected to computer 702 via a wired or wireless connection. In other embodiments, such as a tablet or smartphone, these peripherals are integrated into computer 702. Also connected to system bus 704 is local storage 722, which may be any form of computer-readable media, and may be internally installed in computer 702 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently and do so in a non-transitory fashion. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions for performing computer-implemented methods, data structures, program modules, and other data representations. In some embodiments, non-transitory computer-readable media may store computer-executable instructions that, when executed by at least one processor, perform the methods described above.

Finally, network interface card (NIC) 724 is also attached to system bus 704 and allows computer 702 to communicate over a network such as local network 726. NIC 724 can be any form of network interface known in the art, such as Ethernet, ATM, fiber, BLUETOOTH, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functionality for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732.

What is claimed is:

1. One or more non-transitory computer-readable media storing computer-executable instructions that, when executed by at least one processor, perform a method of identifying code path permutations, the method comprising:
   receiving a plurality of source code files comprising source code instructions and source code predicates determining conditional execution of the source code instructions;
   traversing the plurality of source code files using a path visiting object until a first branch including a first predicate is reached;
   creating a first path object associated with a first value for the first predicate;
   creating a second path object associated with a second value for the first predicate;
   traversing the plurality of source code files using the path visiting object until a second branch including a second predicate is reached;
   determining that the second predicate is deterministic based on the first predicate;
   adding, to the first path object, a first branch outcome based on the first value for the first predicate;
   adding, to the second path object, a second branch outcome based on the second value for the first predicate;
   adding the first path object and the second path object to a list of code path permutations; and
   generating optimized object code based on the plurality of source code files and the list of code path permutations.

2. The one or more non-transitory computer-readable media of claim 1, the method further comprising:
   traversing the plurality of source code files using the path visiting object until a third branch including a third predicate is reached;
   determining that the third predicate is not deterministic based on the first predicate;
   associating, with a first copy of the first path object, a first value for the third predicate;

associating, with a second copy of the first path object, a second value for the third predicate;
associating, with a first copy of the second path object, the first value for the third predicate; and
associating, with a second copy of the second path object, the second value for the third predicate.

3. The one or more non-transitory computer-readable media of claim 2, the method further comprising adding the first copy of the first path object, the second copy of the first path object, the first copy of the second path object, and the second copy of the second path object to the list of code path permutations.

4. The one or more non-transitory computer-readable media of claim 1, the method further comprising:
receiving an indication of a source code method;
receiving a security predicate; and
determining, based in part on the list of code path permutations, that the source code method is never reached within the source code files when the security predicate is false.

5. The one or more non-transitory computer-readable media of claim 1, the method further comprising:
receiving an indication of a variable;
identifying, based in part on the list of code path permutations, one or more paths in which the variable causes a null pointer exception; and
transmitting the one or more paths.

6. The one or more non-transitory computer-readable media of claim 1, the method further comprising:
identifying, based in part on the list of code path permutations, a portion of code which is unreachable; and
transmitting the portion of code.

7. The one or more non-transitory computer-readable media of claim 1, the method further comprising:
determining, based in part on the list of code path permutations, a test case to improve a code coverage metric; and
transmitting the test case.

8. The one or more non-transitory computer-readable media of claim 1, the method further comprising:
traversing the plurality of source code files using the path visiting object until a variable changing statement is reached;
determining that the variable changing statement modifies a variable corresponding to the first predicate to create a modified predicate;
determining that the modified predicate is not deterministic based on the first predicate; and
removing the first predicate from the first path object.

9. A method of identifying code path permutations, the method comprising:
receiving a plurality of source code files comprising source code instructions and source code predicates determining conditional execution of the source code instructions;
traversing the plurality of source code files using a path visiting object until a first branch including a first predicate is reached;
creating a first path object associated with a first value for the first predicate;
creating a second path object associated with a second value for the first predicate;
traversing the plurality of source code files using the path visiting object until a second branch including a second predicate is reached;
determining that the second predicate is deterministic based on the first predicate;
adding, to the first path object, a first branch outcome based on the first value for the first predicate;
adding, to the second path object, a second branch outcome based on the second value for the first predicate;
adding the first path object and the second path object to a list of code path permutations; and
generating optimized object code based on the plurality of source code files and the list of code path permutations.

10. The method of claim 9, the method further comprising:
traversing the plurality of source code files using the path visiting object until a third branch including a third predicate is reached;
determining that the third predicate is not deterministic based on the first predicate;
associating, with a first copy of the first path object, a first value for the third predicate;
associating, with a second copy of the first path object, a second value for the third predicate;
associating, with a first copy of the second path object, the first value for the third predicate; and
associating, with a second copy of the second path object, the second value for the third predicate.

11. The method of claim 10, the method further comprising adding the first copy of the first path object, the second copy of the first path object, the first copy of the second path object, and the second copy of the second path object to the list of code path permutations.

12. The method of claim 9, the method further comprising:
receiving an indication of a source code method;
receiving a security predicate; and
determining, based in part on the list of code path permutations, that the source code method is never reached when the security predicate is false.

13. The method of claim 9, the method further comprising:
receiving an indication of a variable;
identifying, based in part on the list of code path permutations, one or more paths in which the variable causes a null pointer exception; and
transmitting the one or more paths.

14. The method of claim 9, the method further comprising:
identifying, based in part on the list of code path permutations, a portion of code which is unreachable; and
transmitting the portion of code.

15. The method of claim 9, the method further comprising:
determining, based in part on the list of code path permutations, a test case to improve a code coverage metric; and
transmitting the test case.

16. The method of claim 9, the method further comprising:
traversing the plurality of source code files using the path visiting object until a variable changing statement is reached;
determining that the variable changing statement modifies a variable corresponding to the first predicate to create a modified predicate;
determining that the modified predicate is not deterministic based on the first predicate; and
removing the first predicate from the first path object.

17. The method of claim 9, wherein the optimized object code is optimized to reduce execution time.

18. A system for identifying code path permutations, the system comprising:
a data store; and
at least one processor programmed to perform a method for identifying code path permutations, the method comprising:
receiving a plurality of source code files comprising source code instructions and source code predicates determining conditional execution of the source code instructions;
traversing the plurality of source code files using a path visiting object until a first branch including a first predicate is reached;
creating a first path object associated with a first value for the first predicate;
creating a second path object associated with a second value for the first predicate;
traversing the plurality of source code files using the path visiting object until a second branch including a second predicate is reached;
determining that the second predicate is deterministic based on the first predicate;
adding, to the first path object, a first branch outcome based on the first value for the first predicate;
adding, to the second path object, a second branch outcome based on the second value for the first predicate;
adding the first path object and the second path object to a list of code path permutations; and
generating optimized object code based on the plurality of source code files and the list of code path permutations.

19. The system of claim 18, the method further comprising:
traversing the plurality of source code files using the path visiting object until a third branch including a third predicate is reached;
determining that the third predicate is not deterministic based on the first predicate;
associating, with a first copy of the first path object, a first value for the third predicate;
associating, with a second copy of the first path object, a second value for the third predicate;
associating, with a first copy of the second path object, the first value for the third predicate; and
associating, with a second copy of the second path object, the second value for the third predicate.

* * * * *